United States Patent [19]

Klomp et al.

[11] 4,251,254
[45] Feb. 17, 1981

[54] TOOLS FOR THE HANDLING AND SHAPING OF GLASS

[75] Inventors: Johannes T. Klomp; Peter J. Vrugt, both of Eindhoven, Netherlands

[73] Assignee: U.S. Philips Corporation, New York, N.Y.

[21] Appl. No.: 38,021

[22] Filed: May 10, 1979

[30] Foreign Application Priority Data

May 18, 1978 [NL] Netherlands ............... 7805366

[51] Int. Cl.³ ............................................. C03B 40/02
[52] U.S. Cl. ..................................... 65/374 R; 65/26; 65/374 RM
[58] Field of Search ............... 65/374 R, 374 RM, 26

[56] References Cited

U.S. PATENT DOCUMENTS

| 2,201,049 | 5/1940 | Moore | 65/374 UX |
| 3,567,417 | 3/1971 | Winter | 65/374 R X |
| 3,736,109 | 5/1973 | Darling et al. | 65/374 RM X |

FOREIGN PATENT DOCUMENTS 1164988  9/1969  United Kingdom .

Primary Examiner—Arthur D. Kellogg
Attorney, Agent, or Firm—Norman N. Spain

[57] ABSTRACT

Tools for the handling and shaping of glass, such as dies, moulds, shears. Sticking of the glass to the tool is prevented by the presence, at the tool surface, of a layer which has a low intrinsic strength with respect to the glass. This layer may be present as such or may be produced after oxidation. A number of possible materials are: boron carbide, Ni-Cr-B-alloys, tantalum boride.

3 Claims, 1 Drawing Figure

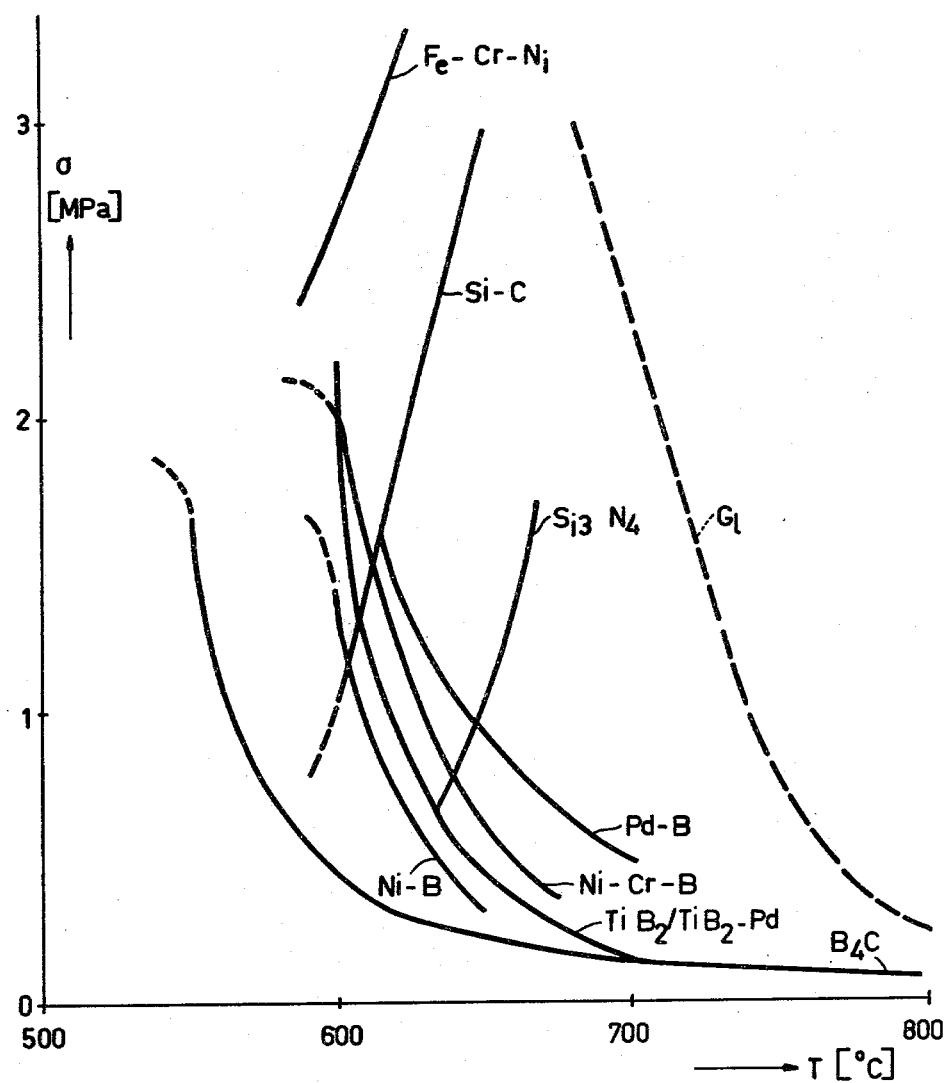

TOOLS FOR THE HANDLING AND SHAPING OF GLASS

The invention relates to tools for the handling and shaping of glass at low viscosities, such as dies, moulds, blow moulds, shears for cutting off glass blobs, etc comprising, at least at the surface, a boron-containing material. The glass must not stick to the tools, and films of boron nitride have been used hitherto to prevent this (U.S. Pat. No. 2,201,049). These films have the drawback that they must be regularly renewed. Moreover, boron nitride has a low mechanical strength.

The above-mentioned low viscosities are understood to mean viscosities of approximately $10^2$–$10^{10}$ poises. At these values the glass ranges from fluid to just softened.

It is an object of the invention to provide tools which have a satisfactory life, are suitable for the handling and shaping of glass, to which the glass does not stick, which do not contaminate the glass surface to an annoying extent and which have a sufficient mechanical strength.

The tools according to the invention are characterized in that they comprise a boron-containing material chosen from one or more borides, boron carbide or boron-containing alloys.

A film of liquid oxide $B_2O_3$ is formed when this boron-containing material is contacted with an oxidizing medium at a temperature above 450° C. It is alternatively possible to form the $B_2O_3$ film by applying an electric field between the tool and the glass melt. This film has a low intrinsic strength relative to glass with which it is in contact. The bond with the glass can be easily broken in this film. However, it should be borne in mind that in this specific case the $B_2O_3$, depending on the composition of the glass and the temperature, may dissolve therein more or less readily, or vice versa. Thefore, the tools must not be in contact with the glass for such a length of time that the low-viscosity intermediate layer has disappeared. Consequently, the tools according to the invention are restricted to uses where the contact with the glass is relatively short, such as a die or a mould.

In an elegant further elaboration of the last-mentioned embodiment the surface is coated with a thin layer of inert material, through which the boron from the boron-containing material can preferentially diffuse. On oxidation the desired oxide, $B_2O_3$ forms predominantly at the surface. The inert material may inter alia be palladium.

Another embodiment of the tools according to the invention comprises, at least in a surface layer, a wear-resistant, porous material, the boron-containing material being present in the pores.

Porous, sintered tungsten or molybdenum can be loaded in this manner with boron. This embodiment has the advantage that, when all the boron has been used up, the material of the tool can again be provided with boron in a simple manner. In the above-defined embodiments the tool has, indeed, a very long life, but this life is nevertheless finite owing to boron consumption by oxidation.

The sole FIGURE in the drawing is a graph showing the composition of various glass working tools and the force necessary to break their bonds to glass as a function of temperature.

The invention will now be described in greater detail with reference to the following embodiments:

EMBODIMENTS:

1. Bodies consisting of different boron-containing materials were contacted at different temperatures for 20 seconds with glass having a composition in a percentage by weight as specified below, this glass being used for screens for cathode-ray tubes for the display of television pictures.

| $SiO_2$ | 64.0 | MgO | 1.2 |
|---|---|---|---|
| $Na_2O$ | 9.6 | $Al_2O_3$ | 3.5 |
| $K_2O$ | 6.5 | $Sb_2O_3$ | 0.6 |
| CaO | 1.8 | $CeO_2$ | 0.2 |
| BaO | 12.4 | SrO | 0.2 |

This glass has the following viscosity values:
log $\eta$ = 13.5 at 465° C. (the annealing temperature),
log $\eta$ = 7.65 at 690° C. (the softening temperature),
log $\eta$ = 4 at 1000° C. (the working temperature).

The following materials were tested for use with this glass: $B_4C$, a Ni-B alloy (81.5 at .% Ni and 18.5 at .% B), a Ni-Cr-B-alloy (Ni 69.3, Cr 14.5 and B 16.2 at .%), Pd-B, containing 95 at .% Pd and 5 at .% B, titanium boride and titanium boride coated with an approximately 3 μm thick Pd layer.

The force necessary to break the bond of these materials to the glass was measured. The graph of the FIGURE of the drawing shows this force in MPa (Mega Pascal) which was calculated from the measured force and the size of the contacting surface. Measurements of the bond of glass to some properly adhering materials (SiC, $Si_3N_4$ and Fe-Cr-Ni) are also shown for comparative purposes. An important criterion therein is whether the adhesion is less than the strength of the glass. As an indication thereof the graph also shows, in a rough approximation the strength of the glass as a function of the temperature (G1). The time the material was in contact with the glass was 20 seconds. The graph shows that the group of boron-containing materials has a decreasing bond strength at an increasing contact temperature whereas the materials which form a fixed oxide skin have a bond strength which increases versus the temperature. In the latter group the breaking strength at high temperatures is determined by the strength of the glass. The wear of $B_4C$ by oxidation in air at 1000° C. is approximately 1 μm/hour.

A tool of wear-resistant porous material (such as tungsten or molybdenum) having a pore volume of 15–20%, containing Pd (27 at .% B) was heated in air at a temperature of 700° C. This heating operation caused the formed $B_2O_3$ to spread across the surface of the wear-resistant material. After which it was contacted at 700° C. for 20 seconds with glass and, the contact was then broken. The fracture was located in the molten oxide layer.

What is claimed is

1. A glass working tool for the handling and shaping of glass at low viscosities, said tool containing at least in its surface layer a boron-containing material selected from the group consisting of titanium boride and boron carbide, said boron-containing material capable, upon oxidation, of forming a layer of boron trioxide at the surface of said tool.

2. A tool as claimed in claim 1 having a surface coated with a thin layer of inert material through which the boron-containing material can preferentially diffuse said inert material being selected from the group consistng of palladium, tungsten and molybdenum.

3. A tool of claim 1 having a surface layer of a wear-resistant, porous material, the pores of which material contain the boron-containing material or the boron trioxide formed therefrom.

* * * * *